(12) United States Patent
Shin

(10) Patent No.: US 10,057,525 B2
(45) Date of Patent: Aug. 21, 2018

(54) IMAGE SENSING DEVICE AND READ-OUT METHOD OF THE SAME

(71) Applicant: SK hynix Inc., Gyeonggi-do (KR)

(72) Inventor: Min-Seok Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 13 days.

(21) Appl. No.: 14/919,166

(22) Filed: Oct. 21, 2015

(65) Prior Publication Data

US 2016/0360135 A1 Dec. 8, 2016

(30) Foreign Application Priority Data

Jun. 5, 2015 (KR) .................. 10-2015-0079912

(51) Int. Cl.
*H04N 5/378* (2011.01)
*H04N 5/376* (2011.01)

(52) U.S. Cl.
CPC ........... *H04N 5/378* (2013.01); *H04N 5/3765* (2013.01)

(58) Field of Classification Search
CPC ...... H04N 5/378; H04N 5/374; H04N 5/3765; H04N 5/23245; H04N 5/2355; H01L 2224/48227; H01L 27/14643
See application file for complete search history.

(56) References Cited

U.S. PATENT DOCUMENTS

| | | | | |
|---|---|---|---|---|
| 2007/0018074 A1* | 1/2007 | Kinoshita | ............. | H04N 9/045 250/208.1 |
| 2010/0253560 A1* | 10/2010 | Kudo | ...................... | H03K 4/02 341/143 |
| 2010/0253821 A1* | 10/2010 | Yamamoto | ............... | H03K 4/02 348/294 |

FOREIGN PATENT DOCUMENTS

KR 1020040095856 11/2004

* cited by examiner

*Primary Examiner* — Twyler Haskins
*Assistant Examiner* — Carramah J Quiett
(74) *Attorney, Agent, or Firm* — IP & T Group LLP

(57) ABSTRACT

An image sensing device includes a read-out control block suitable for generating a selection address signal and one or more address clock signals based on a source address signal, and a judge clock signal having a higher frequency than a source clock signal; and a read-out block suitable for reading out a plurality of pixel signals in response to the selection address signal, the address clock signals and the judge clock signal.

16 Claims, 14 Drawing Sheets

IMAGE SENSING DEVICE AND READ-OUT METHOD OF THE SAME

CROSS-REFERENCE TO RELATED APPLICATIONS

The present application claims priority of Korean Patent Application No, 10-2015-0079912, filed on Jun. 5, 2015, which is incorporated herein by reference in its entirety.

BACKGROUND

1. Field

Exemplary embodiments of the present invention relate to a semiconductor design technology and, more particularly, to an image sensing device and a read-out method of the same.

2. Description of the Related Art

Image sensing devices capture images using the photosensitive properties of semiconductors. Image sensing devices may be classified into charge coupled device (CCD) image sensors and complementary metal oxide semiconductor (CMOS) image sensors. The CMOS image sensors have come into widespread use. This is because CMOS image sensors allow for analog circuits and digital control circuits to be realized on a single integrated circuit (IC).

Image sensing devices may adopt a column-parallel scheme in order to improve read-out speed.

FIG. 1 illustrates an image sensing device 10 according to a prior art.

Referring to FIG. 1, the image sensing device 10 includes a pixel block 11 and a read-out block 13.

The pixel block 11 includes a plurality of pixels arranged in rows and columns. FIG. 1 exemplarily shows 8*2 pixels, which may be a part of the plurality of pixels in the pixel block 11. The pixel block 11 outputs pixel signals V<1:8> by rows based on the column-parallel scheme. For example, the pixel block 11 outputs the pixel signals V<1:8> from the pixels arranged in a first row ROW1, and subsequently outputs the pixel signals V<1:8> from the pixels arranged in a second row ROW2.

The read-out block 13 converts the pixel signals V<1:8> into digital signals D<1:8> in response to a source clock signal COL_CLK and sequentially outputs the digital signals D<1:8> to a common channel CH1.

However, there is a concern as follows in the image sensing device 10 having the aforementioned structure.

As the number of the pixels included in the pixel block 11 and the resolution of the image sensing device 10 increases, the number of row lines and column lines also increase. Consequently, the number of the pixel signals that have to be read out during a unit row time increases while the number of pixel signals from the read-out block 13 to the common channel CH1 during the limited unit row time is restricted. Thus, as the resolution of the image sensing device 10 increases, the pixel signals of the column lines take longer to be read out and may not finish within their allotted time.

SUMMARY

Exemplary embodiments of the present invention are directed to an image sensing device capable of improving read-out speed while occupying a minimum amount of area.

Also, exemplary embodiments of the present invention are directed to an image sensing device capable of performing a reliable read-out operation.

In accordance with an embodiment of the present invention, an image sensing device includes: a read-out control block suitable for generating a selection address signal and one or more address clock signals based on a source address signal, and a judge clock signal having a higher frequency than a source clock signal; and a read-out block suitable for reading out a plurality of pixel signals in response to the selection address signal, the address clock signals, and the judge clock signal.

The read-out control block may delay the source clock signal by a predetermined delay time, and output the delayed source clock as the address clock signal. The read-out control block may sample the source address signal as the selection address signal based on the delayed source clock signal.

The read-out control block may generate the judge clock signal with a frequency two times higher than a frequency of the source clock signal.

In accordance with another embodiment of the present invention, an image sensing device includes: an address control block suitable for generating a selection address signal and a first delayed clock signal in response to a source address signal and a source clock signal; a read-out control block suitable for generating a judge clock signal having a higher frequency than the source clock signal, and a precharge signal having the same frequency as the judge clock signal in response to the source clock signal and the first delayed clock signal; a first read-out block suitable for sequentially reading out N number of pixel signals M number of times (M is equal to or greater than 2) per a single period of the source clock signal through N number of channels in response to the selection address signal and the first delayed clock signal; and a second read-out block suitable for sequentially reading out M*N number of digital signals sequentially read out through the N number of channels in units of predetermined groups in response to the judge clock signal and the precharge signal.

The address control block may include: a first delay unit suitable for generating the first delayed clock signal by delaying the source clock signal by a first delay time; and a sampling unit suitable for sampling the source address signal as the selection address signal based on the first delayed clock signal.

The read-out control block may include: a judge control part suitable for generating the judge clock signal in response to the source clock signal and the first delayed clock signal; and a precharge control part suitable for generating the precharge signal having a different phase from the judge clock signal in response to the judge clock signal.

The judge control part may include an exclusive OR (XOR) gate.

The precharge control part may include an edge detector for detecting a rising edge or a falling edge of the judge clock signal to generate the precharge signal.

The precharge control part may include: a second delay unit suitable for generating a second delayed clock signal by delaying the judge clock signal by a second delay time; and a pulse width extension unit suitable for generating the precharge signal, a pulse width of which is greater than a pulse width of the judge clock signal, in response to the second delayed clock signal and the judge clock signal.

The pulse width extension unit may include an exclusive OR (XOR) gate.

The second delay time may be greater than the first delay time.

The first read-out block may include: an address decoding part suitable for sequentially generating M number of enable signals per a single period of the source clock signal by decoding the selection address signal and the first delayed clock signal; and a column operation part suitable for sequentially outputting the N number of pixel signals per a single period of the source clock signal the M number of times to the N number of channels in response to the M number of enable signals.

The second read-out block may include: an amplification part suitable for amplifying the N number of digital signals the M number of times per a single period of the source clock signal to generate M*N number of data signals; and a data alignment part suitable for aligning and outputting the M*N number of data signals in response to the first delayed clock signal.

The data alignment part may include: a first storing unit suitable for storing the N number of data signals, which are generated firstly from the amplification part, in synchronization with one of a rising edge and a falling edge of the first delayed clock signal; a second storing unit suitable for storing the N number of data signals, which are stored in the first storing unit, in synchronization with the other edge of the first delayed clock signal; and a third storing unit suitable for storing the N number of data signals, which are generated secondly from amplification part, in synchronization with the other edge of the first delayed clock signal.

The first read-out block may sequentially read out four pixel signals per single period of the source clock signal two times through four channels in response to the selection address signal and the first delayed clock signal. The second read-out block may simultaneously read out eight digital signals that are sequentially read out through the four channels, in response to the judge clock signal and the precharge signal.

In accordance with another embodiment of the present invention, a read-out method of an image sensing device includes: sequentially inputting a source address signal together with a source clock signal; and reading out a plurality of pixel signals by a double data rate (DDR) scheme through N number of channels in response to the source clock signal and the source address signal.

The reading-out of the pixel signals may include: generating a judge clock signal and a precharge signal, a frequency of which are two times higher than a frequency of the source clock signal, and first and second enable signals per the source address signal; and sequentially reading out a couple of pixel signals per a single period of the source clock signal through each of the channels in response to the judge clock signal, the precharge signal and the first and second enable signals.

The generating of the precharge signal may be performed by detecting the rising edge or the falling edge of the judge clock signal, or by performing a logical operation on two or more delayed clock signals that are derived from the source clock signal.

The reading-out of the pixel signals may simultaneously read out 2*N number of digital signals that are read out by the DDR scheme per a single period of the source clock signal.

The reading-out of the pixel signals may include: temporarily storing N number of digital signals, which are read out earlier among the 2*N digital signals, in response to one of the rising edge and the falling edge of the source clock signal; and simultaneously reading out N number of digital signals, which are read out later among the 2*N digital signals, and the temporarily stored N number of digital signals in response to the other edge of the source clock signal.

DETAILED DESCRIPTION

Exemplary embodiments of the present invention are described below in more detail with reference to the accompanying drawings. These embodiments are provided so that this disclosure is thorough and complete, and fully conveys the scope of the present invention to those skilled in the art. All "embodiments" referred to in this disclosure refer to embodiments of the inventive concept disclosed herein. The embodiments presented are merely examples and are not intended to limit the inventive concept.

The terminology used herein is for the purpose of describing particular embodiments only and is not intended to limit the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of one or more of the associated listed items. In addition, "connected/coupled" refers to one component not only directly coupling another component but also indirectly coupling another component through an intermediate component.

Figure 1:
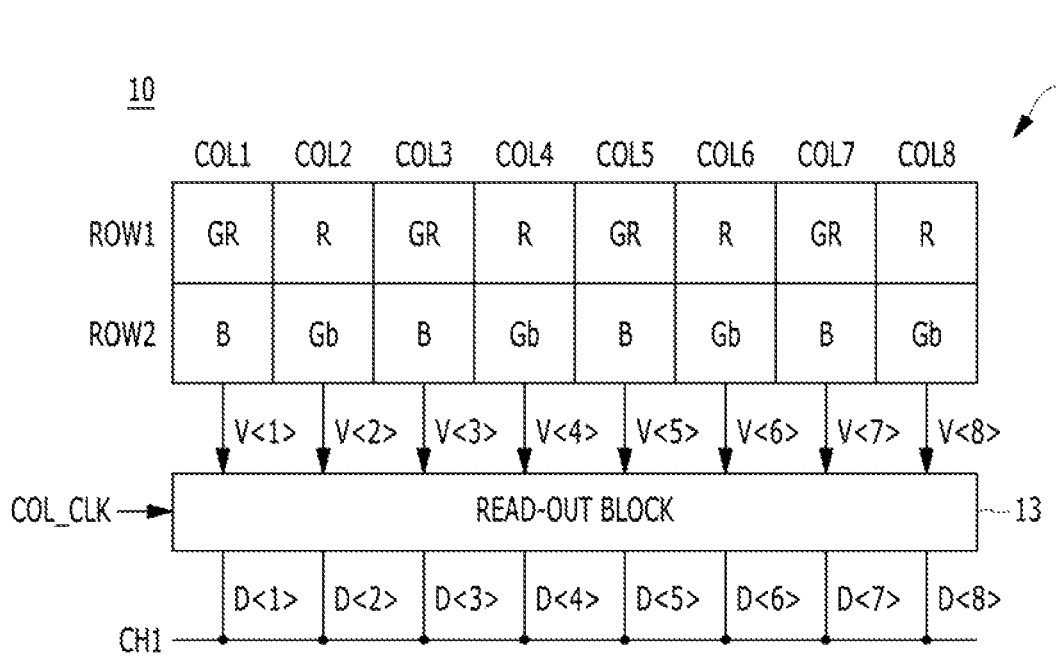
FIG. 1 is a block diagram illustrating an image sensing device according to prior art.
Figure 2:
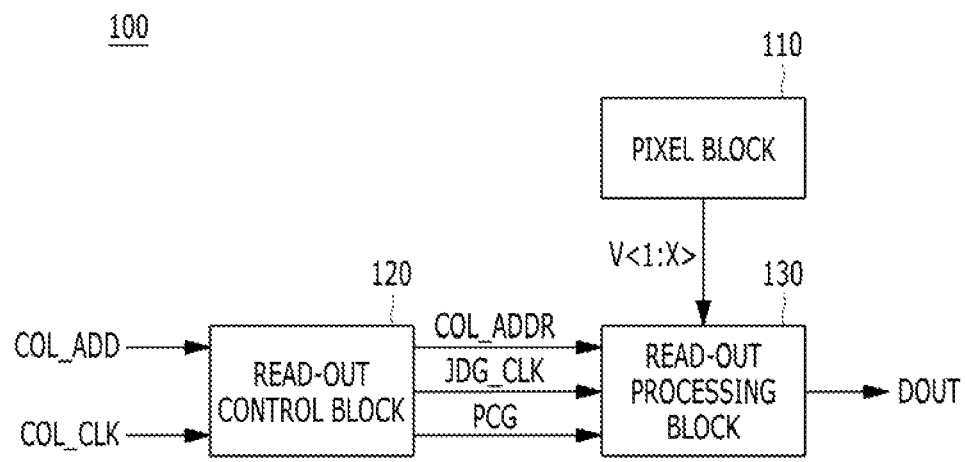
FIG. 2 is a block diagram illustrating an image sensing device according to a comparative example.

FIG. 2 is a block diagram illustrating an image sensing device 100 according to a comparative example.

Referring to FIG. 2, the image sensing device 100 includes a pixel block 110, a read-out control block 120, and a read-out processing block 130.

The pixel block 110 includes a plurality of pixels (not shown) arranged in rows and columns. For example, the pixel block 110 includes X*Y pixels. The pixel block 110 generates a plurality of pixel signals V<1:X> by rows.

For example, the pixel block 110 generates first to $X^{th}$ pixel signals V<1:X> Y numbers of times for Y numbers of unit rows of the pixel block 110. In other words, the pixel block 110 simultaneously outputs the first to $X^{th}$ pixel signals V<1:X> from X pixels arranged in a first row through first to $X^{th}$ column lines during a first unit row time, and simultaneously outputs the first to $X^{th}$ pixel signals V<1:X> from X pixels arranged in a second row through first to $X^{th}$ column lines during a second unit row time, and simultaneously outputs the first to $X^{th}$ pixel signals V<1:X> from X pixels arranged in a $Y^{th}$ row through first to $X^{th}$ column lines during a $Y^{th}$ unit row time.

Among the first to $X^{th}$ pixel signals V<1:X>, first to eighth pixel signals V<1:8> are referred to as a first pixel group signal V<1:8>, and ninth to $16^{th}$ pixel signals V<9:16> are referred to as a second pixel group signal V<9:16>, and $(X-7)^{th}$ to $X^{th}$ pixel signals V<X-7:X> are referred to as a $K^{th}$ pixel group signal V<X-7:X>. The first to $X^{th}$ pixel signals V<1:X> includes the first to $K^{th}$ pixel group signals V<1:8> to V<X-7:X>.

The read-out control block 120 generates a column address signal COL_ADDR, a judge clock signal JDG_CLK and a precharge signal PCG for controlling operations of the read-out processing block 130 in response to a source clock signal COL_CLK and a source address signal COL_ADD.

The read-out processing block 130 sequentially reads out the first to $K^{th}$ pixel group signals V<1:8> to V<X-7:X> as a data group signal DOUT in response to the column address signal COL_ADDR, the judge clock signal JDG_CLK and the precharge signal PCG.

Figure 3:
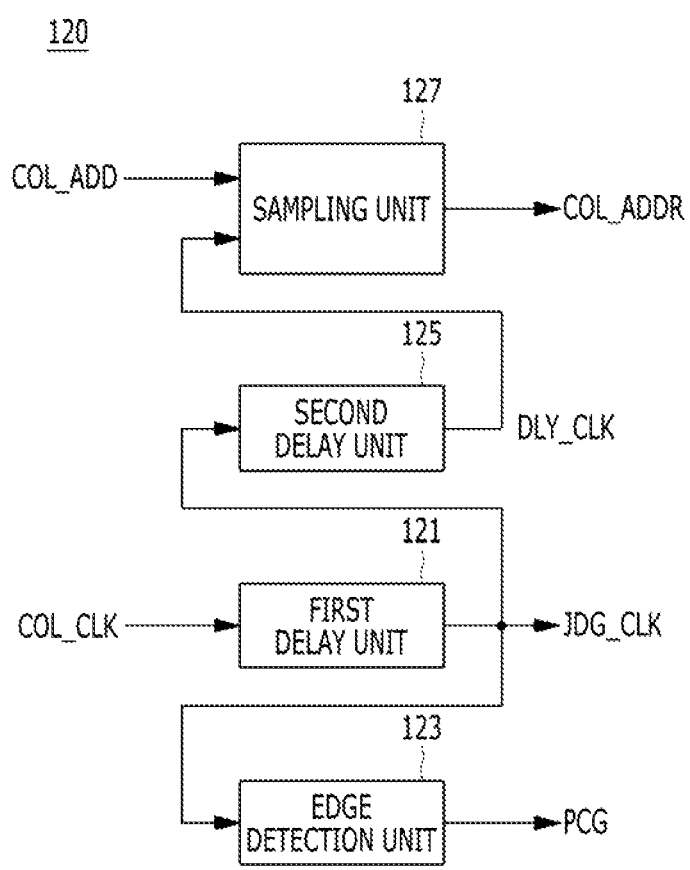
FIG. 3 is a block diagram illustrating a read-out control block shown in FIG. 2.

FIG. 3 is a block diagram illustrating the read-out control block 120 shown in FIG. 2.

Referring to FIG. 3, the read-out control block 120 includes a first delay unit 121, an edge detection unit 123, a second delay unit 125, and a sampling unit 127.

The first delay unit 121 delays the source clock signal COL_CLK by a predetermined first delay time to generate the judge clock signal JDG_CLK.

The edge detection unit 123 detects a rising edge of the judge clock signal JDG_CLK to generate the precharge signal PCG.

The second delay unit 125 delays the judge clock signal JDG_CLK by a predetermined second delay time to generate a delayed clock signal DLY_CLK.

The sampling unit 127 samples the source address signal COL_ADD based on the delayed clock signal DLY_CLK to generate the column address signal COL_ADDR.

Figure 4:
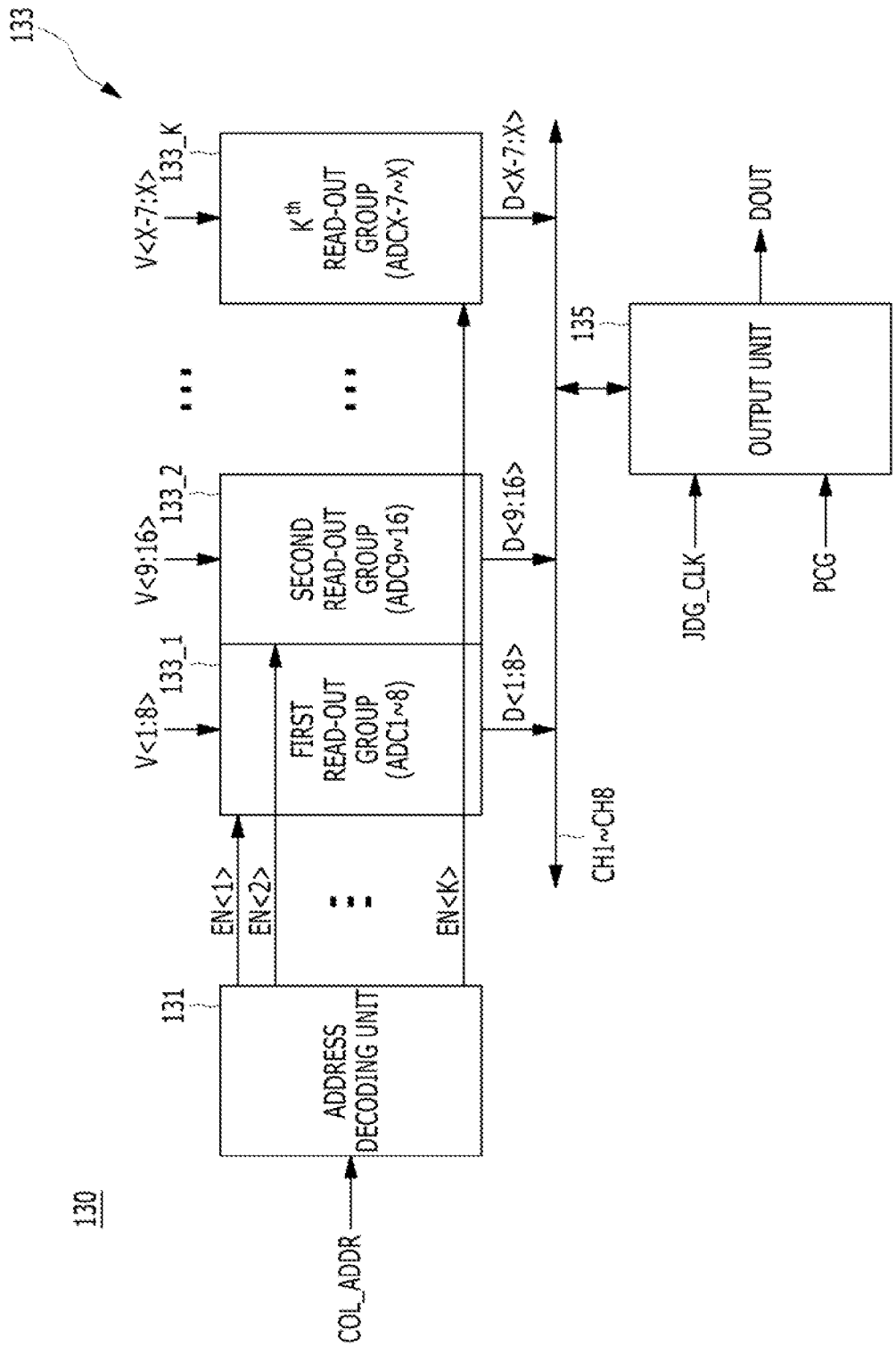
FIG. 4 is a block diagram illustrating a read-out processing block shown in FIG. 2.

FIG. 4 is a block diagram illustrating the read-out processing block 130 shown in FIG. 2.

Referring to FIG. 4, the read-out processing block 130 includes an address decoding unit 131, a read-out unit 133, and an output unit 135.

The address decoding unit 131 decodes the column address signal COL_ADDR to sequentially generate first to $K^{th}$ enable signals EN<1:K>.

The read-out unit 133 includes first to $K^{th}$ read-out groups 133_1 to 133_K. The first to $K^{th}$ read-out groups 133_1 to 133_K sequentially operate in response to the first to $K^{th}$ enable signals EN<1:K>, and include 8 analog-to-digital converters ADC each corresponding to 8 column lines.

For example, first to eighth analog-to-digital converters ADC1 to ADC8 included in the first read-out group 133_1 simultaneously convert the first pixel group signal V<1:8> transmitted through the first to eighth column lines into first to eighth digital signals D<1:8>, and then simultaneously read out the first to eighth digital signals D<1:8> to first to eighth channels CH1 to CH8 in response to the first enable signal EN<1>. Ninth to $16^{th}$ analog-to-digital converters ADC9 to ADC16 included in the second read-out group 133_2 simultaneously convert the second pixel group signal V<9:16> transmitted through the ninth to $16^{th}$ column lines into ninth to $16^{th}$ digital signals D<9:16>, and then simultaneously read out the ninth to $16^{th}$ digital signals D<9:16> to the first to eighth channels CH1 to CH8 in response to the second enable signal EN<2>. $(X-7)^{th}$ to $X^{th}$ analog-to-digital converters ADCX-7 to ADCX included in the $K^{th}$ read-out group 133_K simultaneously convert the $K^{th}$ pixel group signal V<X-7:X> transmitted through the $(X-7)^{th}$ to $K^{th}$ column lines into $(X-7)^{th}$ to $X^{th}$ digital signals D<X-7:X>, and then simultaneously read out the $(X-7)^{th}$ to $X^{th}$ digital signals D<X-7:X> to the first to eighth channels CH1 to CH8 in response to the $K^{th}$ enable signal EN<K>.

Among the first to $X^{th}$ digital signals D<1:X>, the first to eighth digital signals D<1:8> are referred to as a first digital group signal D<1:8>, and the ninth to $16^{th}$ digital signals D<9:16> are referred to as a second digital group signal D<9:16>, and the $(X-7)^{th}$ to $X^{th}$ digital signals D<X-7:X> are referred to as a $K^{th}$ digital group signal D<X-7:X>. The first to $X^{th}$ digital signals D<1:X> includes the first to $K^{th}$ digital group signals D<1:8> to D<X-7:X>.

A coupling structure between the read-out unit 133 and the first to eighth channels CH1 to CH8 is described in detail with reference to FIG. 5.

Figure 5:
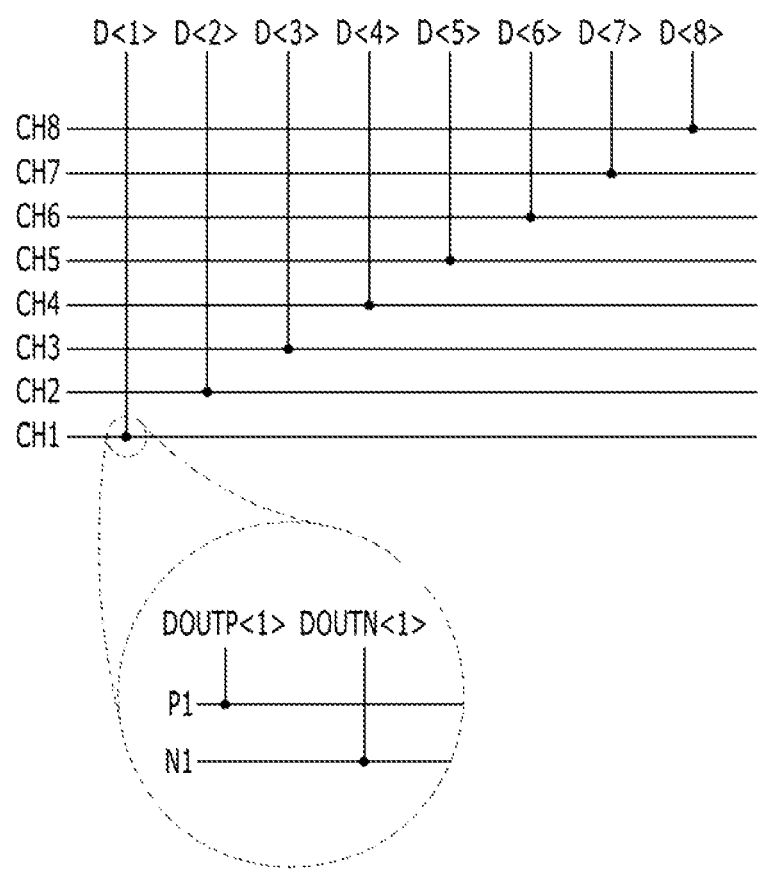
FIG. 5 is a diagram illustrating a coupling structure between a first read-out group and first to eighth channels shown in FIG. 4.

FIG. 5 is a diagram illustrating a coupling structure between a read-out unit 133 shown in FIG. 4 and first to eighth channels CH1 to CH8. FIG. 5 exemplarily shows the coupling structure between the first read-out group 133_1 and the first to eighth channels CH1 to CH8.

Referring to FIG. 5, output lines of the first digital group signal D<1:8> outputted from the first read-out group 133_1 are coupled with the first to eighth channels CH1 to CH8, respectively.

Each of the first to eighth channels CH1 to CH8 includes differential lines. For example, the first channel CH1 includes first differential lines P1 and N1. Although not illustrated in the drawing, the second to eighth channels CH2 to CH8 include second to eighth differential lines P2 to P8 and N2 to N8. Each of the first to $X^{th}$ digital signals D<1:X> includes differential signals. For example, the first digital signal D<1> includes first differential signals DOUTP<1> and DOUTN<1>, and the first differential signals DOUTP<1> and DOUTN<1> are read out to the first differential lines P1 and N1. Although not illustrated in the drawing, the second to eighth digital signals D<2:8> include second to eighth differential signals DOUTP<2:8> and DOUTN<2:8>, and the second to eighth differential signals DOUTP<2:8> and DOUTN<2:8> are read out to the second to eighth differential lines P2 to P8 and N2 to N8.

Referring back to FIG. 4, the output unit 135 amplifies the first to $K^{th}$ digital group signals D<1:8> to D<X-7:X> that are read out to the first to eighth channels CH1 to CH8 in response to the judge clock signal JDG_CLK and the precharge signal PCG. For example, in the first digital signal D<1> included in the first digital group signal D<1:8>, the output unit 135 precharges the first differential lines P1 and N1 to the same voltage level in response to the precharge signal PCG, and subsequently senses and amplifies a voltage difference occurring between the first differential lines P1 and N1 when the first differential signals DOUTP<1> and DOUTN<1> are read out.

Figure 6:
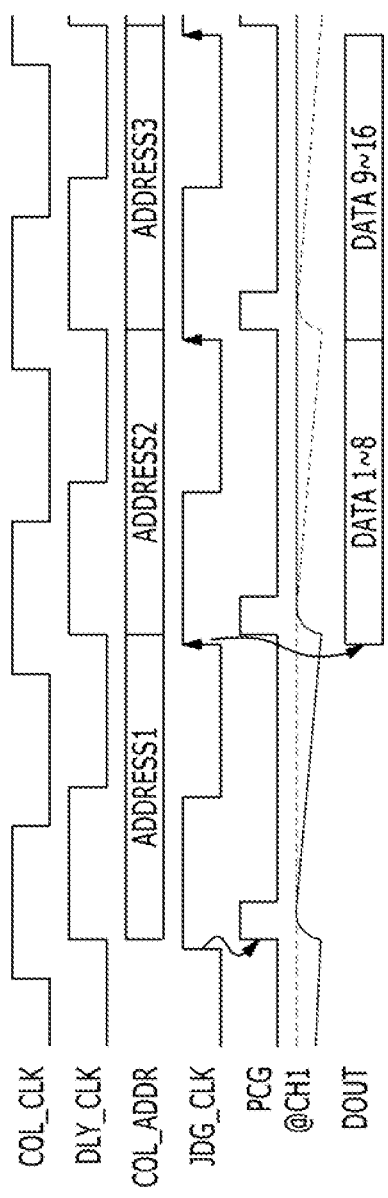
FIG. 6 is a timing diagram for describing an operation of an image sensing device shown in FIG. 2.

FIG. 6 is a timing diagram for describing an operation of the image sensing device 100 shown in FIG. 2.

Although not illustrated in the drawing, an operation of the pixel block 110 is described. The pixel block 110 generates the first to $X^{th}$ pixel signals V<1:X> every unit row time. For example, the pixel block 110 generates the first to $X^{th}$ pixel signals V<1:X> from the first to $X^{th}$ pixels (not shown) arranged in a first row during the first unit row time, and generates the first to $X^{th}$ pixel signals V<1:X> from the first to $X^{th}$ pixels (not shown) arranged in a second row during the second unit row time, and generates the first to $X^{th}$ pixel signals V<1:X> from the first to $X^{th}$ pixels (not shown) arranged in a last row during a last unit row time.

Referring to FIGS. 2 to 6, the read-out control block 120 delays the source clock signal COL_CLK by the first delay time to generate the judge clock signal JDG_CLK, detects a rising edge of the judge clock signal JDG_CLK to generate the precharge signal PCG that pulses at the rising edge based on the detection result, delays the judge clock signal JDG_CLK by the second delay time to generate the delayed clock signal DLY_CLK, and synchronizes the source address signal COL_ADD with the delayed clock signal DLY_CLK to generate the source address signal COL_ADD as the column address signal COL_ADDR.

The read-out processing block 130 periodically precharges the first to eighth channels CH1 to CH8 in response to the precharge signal PCG, and reads out the first to $X^{th}$ pixel signals V<1:X> by column groups in response to the judge clock signal JDG_CLK and the column address signal COL_ADDR. This is described below in detail.

The read-out processing block 130 precharges the first to eighth channels CH1 to CH8 to a predetermined voltage level in response to the precharge signal PCG. For example, the read-out processing block 130 precharges the first to eighth differential lines P1 to P8 and N1 to N8 to a high voltage VDD level.

The read-out processing block 130 sequentially reads out the first to $K^{th}$ digital group signals D<1:8> to D<X-7:X>, which correspond to the first to $K^{th}$ pixel group signals V<1:8> to V<X-7:X>, to the first to eighth channels CH1 to CH8 in response to the column address signal COL_ADDR and amplifies the first to $K^{th}$ digital group signals D<1:8> to D<X-7:X> that are read out to the first to eighth channels CH1 to CH8 by column groups and sequentially reads out the amplified digital group signals as the data group signal DOUT.

To be specific, the address decoding unit 131 decodes the column address signal COL_ADDR every period of the delayed clock signal DLY_CLK to sequentially generate the first to $K^{th}$ enable signals EN<1:K>, and the first to $K^{th}$ read-out groups 133_1 to 133_K sequentially output the first to $K^{th}$ digital group signals D<1:8> to D<X-7:X> to the first to eighth channels CH1 to CH8 in response to the first to $K^{th}$ enable signals EN<1:K>.

For example, the first read-out group 133_1 converts the first pixel group signal V<1:8> into the first digital group signal D<1:8> and outputs the converted group signal to the first to eighth channels CH1 to CH8 in response to the first enable signal EN<1>, and the second read-out group 133_2 converts the second pixel group signal V<9:16> into the second digital group signal D<9:16> and outputs the converted group signal to the first to eighth channels CH1 to CH8 in response to the second enable signal EN<2>, and the $K^{th}$ read-out group 133_K converts the $K^{th}$ pixel group signal V<X-7:X> into the $K^{th}$ digital group signal D<X-7:X> and outputs the converted group signal to the first to eighth channels CH1 to CH8 in response to the $K^{th}$ enable signal EN<K>.

Each of the first to eighth channels CH1 to CH8 includes the differential lines, and each of the first to $X^{th}$ digital signals D<1:X> includes differential signals. Hereinafter, the digital signals D<1> to D<X-7> outputted to the first channel CH1 are representatively described.

The first differential signals DOUTP<1> and DOUTN<1> corresponding to the first digital signal D<1> are outputted to the first differential lines P1 and N1 corresponding to the first channel CH1 during an enabling section of the first enable signal EN<1>, and the ninth differential signals DOUTP<9> and DOUTN<9> corresponding to the ninth digital signal D<9> are outputted to the first differential lines P1 and N1 corresponding to the first channel CH1 during an enabling section of the second enable signal EN<2>, and the $(X-7)^{th}$ differential signals DOUTP<X-7> and DOUTN<X-7> corresponding to the $(X-7)^{th}$ digital signal D<X-7> are outputted to the first differential lines P1 and N1 corresponding to the first channel CH1 during an enabling section of the $K^{th}$ enable signal EN<K>.

To sum up, the output unit 135 precharges the first to eighth channels CH1 to CH8 to the predetermined voltage level during a predetermined section corresponding to a first rising edge of the judge clock signal JDG_CLK in response to the precharge signal PCG. For example, the output unit 135 precharges the first differential lines P1 and N1 to the high voltage VDD level. The first read-out group 133_1 outputs the first digital group signal D<1:8> corresponding to the first pixel group signal V<1:8> to the first to eighth channels CH1 to CH8 during a first period of the delayed clock signal DLY_CLK.

For example, the first read-out group 133_1 drives one of the first differential lines P1 and N1 to a low voltage VSS level based on the first digital signal D<1>. The output unit 135 amplifies the first digital group signal D<1:8> outputted to the first to eighth channels CH1 to CH8 and reads out the amplified signal as the data group signal DOUT at a moment corresponding to a second rising edge of the judge clock signal JDG_CLK, and subsequently precharges the first to eighth channels CH1 to CH8 to the predetermined voltage level during a predetermined section corresponding to the second rising edge of the judge clock signal JDG_CLK in response to the precharge signal PCG.

For example, the output unit 135 generates the data group signal DOUT by amplifying a voltage difference occurring between the first differential lines P1 and N1, and precharges the first differential lines P1 and N1 to the high voltage VDD level again. Subsequently, as the read-out processing block 130 repeatedly carries out the foregoing process for the second to $K^{th}$ pixel group signals V<9:16> to V<X-7:X>, the data group signal DOUT corresponding to the second to $K^{th}$ pixel group signals V<9:16> to V<X−7:X> is sequentially read out.

According to the comparative example, the image sensing device 100 may improve a read-out speed by performing a read-out operation based on the first to eighth channels CH1 to CH8.

However, the image sensing device 100 having the aforementioned structure may have a problem in the size of the area occupied by the first to eighth channels CH1 to CH8.

However, in accordance with exemplary embodiments of the present invention, an image sensing device may have improved read-out speed with reduced occupied area.

In the embodiments of the present invention, an image sensing device performing a read-out operation based on a double data rate (DDR) scheme through first to fourth channels is described as an example.

Figure 7:
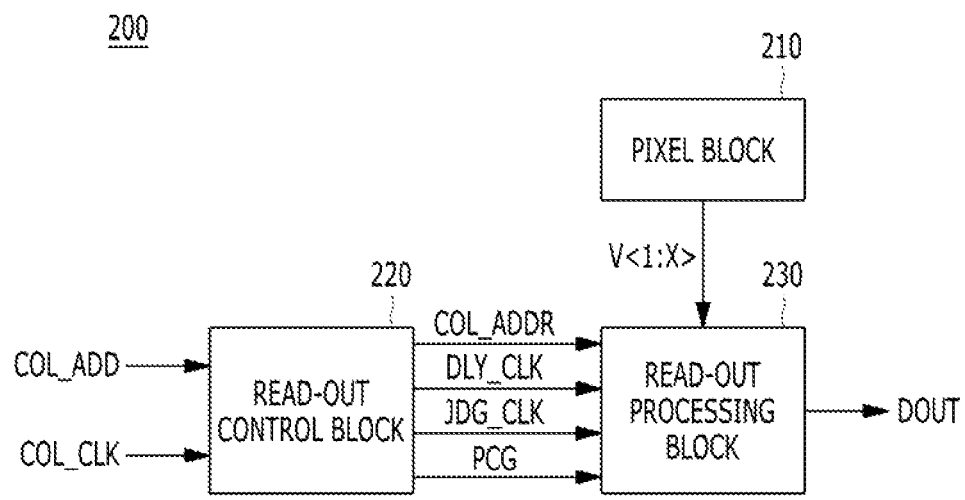
FIG. 7 is a block diagram illustrating an image sensing device in accordance with an embodiment of the present invention.

FIG. 7 is a block diagram illustrating an image sensing device 200 in accordance with an embodiment of the present invention.

Referring to FIG. 7, the image sensing device 200 may include a pixel block 210, a read-out control block 220 and a read-out processing block 230.

The pixel block 210 may include a plurality of pixels (not shown) arranged in rows and columns. For example, the pixel block 210 may include X*Y pixels. The pixel block 210 may generate a plurality of pixel signals V<1:X> by rows. The pixel block 210 may have the same structure as the pixel block 110 included in the image sensing device 100 according to the comparative example described above.

For example, the pixel block 210 may generate first to $X^{th}$ pixel signals V<1:X> Y numbers of times for Y numbers of unit rows of the pixel block 210. In other words, the pixel block 210 may simultaneously output the first to $X^{th}$ pixel signals V<1:X> from X pixels arranged in a first row through first to $X^{th}$ column lines during a first unit row time, and simultaneously output the first to $X^{th}$ pixel signals V<1:X> from X pixels arranged in a second row through first to $X^{th}$ column lines during a second unit row time, and simultaneously output the first to $X^{th}$ pixel signals V<1:X> from X pixels arranged in a $Y^{th}$ row through first to $X^{th}$ column lines during a $Y^{th}$ unit row time.

Among the first to $X^{th}$ pixel signals V<1:X>, first to fourth pixel signals V<1:4> are referred to as a first pixel group signal V<1:4>, and fifth to eighth pixel signals V<5:8> are referred to as a second pixel group signal V<5:8>, and $(X−3)^{th}$ to $X^{th}$ pixel signals V<X−3:X> are referred to as a $2K^{th}$ pixel group signal V<X−3:X>. The first to $X^{th}$ pixel signals V<1:X> may include the first to $2K^{th}$ pixel group signals V<1:4> to V<X−3:X>.

The read-out control block 220 may generate a column address signal COL_ADDR, a delayed clock signal DLY_CLK, a judge clock signal JDG_CLK and a precharge signal PCG for controlling an operation of the read-out processing block 230 in response to a source clock signal COL_CLK and a source address signal COL_ADD.

The read-out processing block 230 may read out the first to $2K^{th}$ pixel group signals V<1:4> to V<X−3:X> in response to the column address signal COL_ADDR, the delayed clock signal DLY_CLK, the judge clock signal JDG_CLK and the precharge signal PCG.

Figure 8:
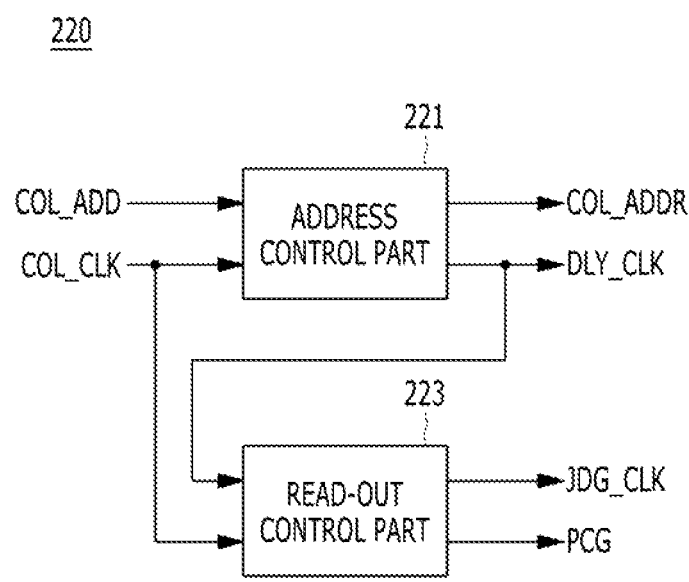
FIG. 8 is a block diagram illustrating a read-out control block shown in FIG. 7.

FIG. 8 is a block diagram illustrating the read-out control block 220 shown in FIG. 7.

Referring to FIG. 8, the read-out control block 220 may include an address control part 221 and a read-out control part 223.

The address control part 221 may generate the column address signal COL_ADDR and the delayed clock signal DLY_CLK in response to the source address signal COL_ADD and the source clock signal COL_CLK. The address control part 221 is described below in detail.

The read-out control part 223 may generate the judge clock signal JDG_CLK and the precharge signal PCG in response to the source clock signal COL_CLK and the delayed clock signal DLY_CLK. The read-out control part 223 is described below in detail.

Figure 9:
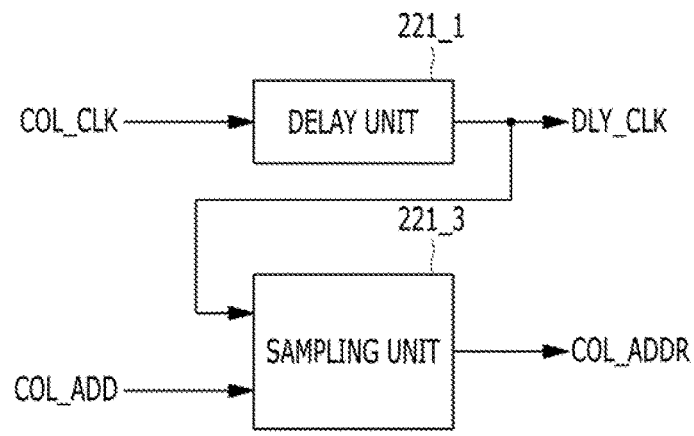
FIG. 9 is a block diagram illustrating an address control part shown in FIG. 8.

FIG. 9 is a block diagram illustrating the address control part 221 shown in FIG. 8.

Referring to FIG. 9, the address control part 221 may include a delay unit 221_1 and a sampling unit 221_3.

The delay unit 221_1 may generate the delayed clock signal DLY_CLK that is delayed by a predetermined delay time from the source clock signal COL_CLK in response to the source clock signal COL_CLK. For example, the delay unit 221_1 may include an inverter chain.

The sampling unit 221_3 may sample the source address signal COL_ADD as the column address signal COL_ADDR based on the delayed clock signal DLY_CLK. For example, the sampling unit 221_3 may include a D flip-flop.

Figure 10:
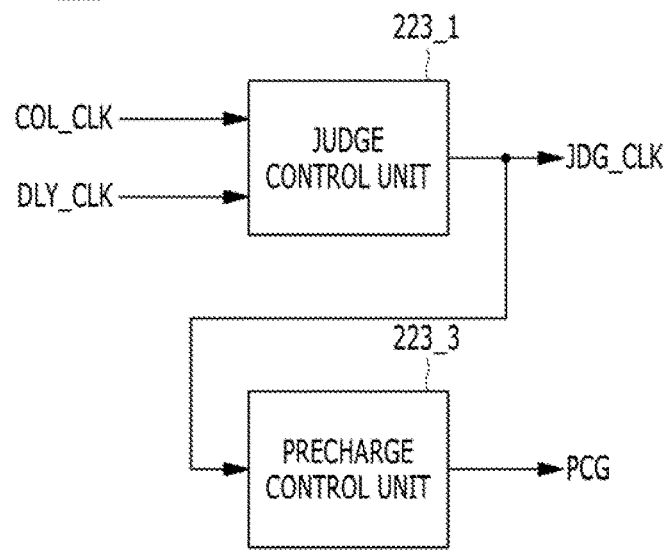
FIG. 10 is a block diagram illustrating a read-out control part shown in FIG. 8.

FIG. 10 is a block diagram illustrating the read-out control part 223 shown in FIG. 8.

Referring to FIG. 10, the read-out control part 223 may include a judge control unit 223_1 and a precharge control unit 223_3.

The judge control unit 223_1 may generate the judge clock signal JDG_CLK, a frequency of which is two times higher than a frequency of the source clock signal COL_CLK, in response to the source clock signal COL_CLK and the delayed clock signal DLY_CLK. For example, the judge control unit 223_1 may include an exclusive OR gate for outputting the judge clock signal JDG_CLK by performing an exclusive OR (XOR) operation on the source clock signal COL_CLK and the delayed clock signal DLY_CLK.

The precharge control unit 223_3 may generate the precharge signal PCG, which has the same frequency as the judge clock signal JDG_CLK, in response to the judge clock signal JDG_CLK. The precharge signal PCG may have a different phase from the judge clock signal JDG_CLK. For example, the precharge control unit 223_3 may include an edge detector for generating the precharge signal PCG by detecting a falling edge of the judge clock signal JDG_CLK.

Figure 11:
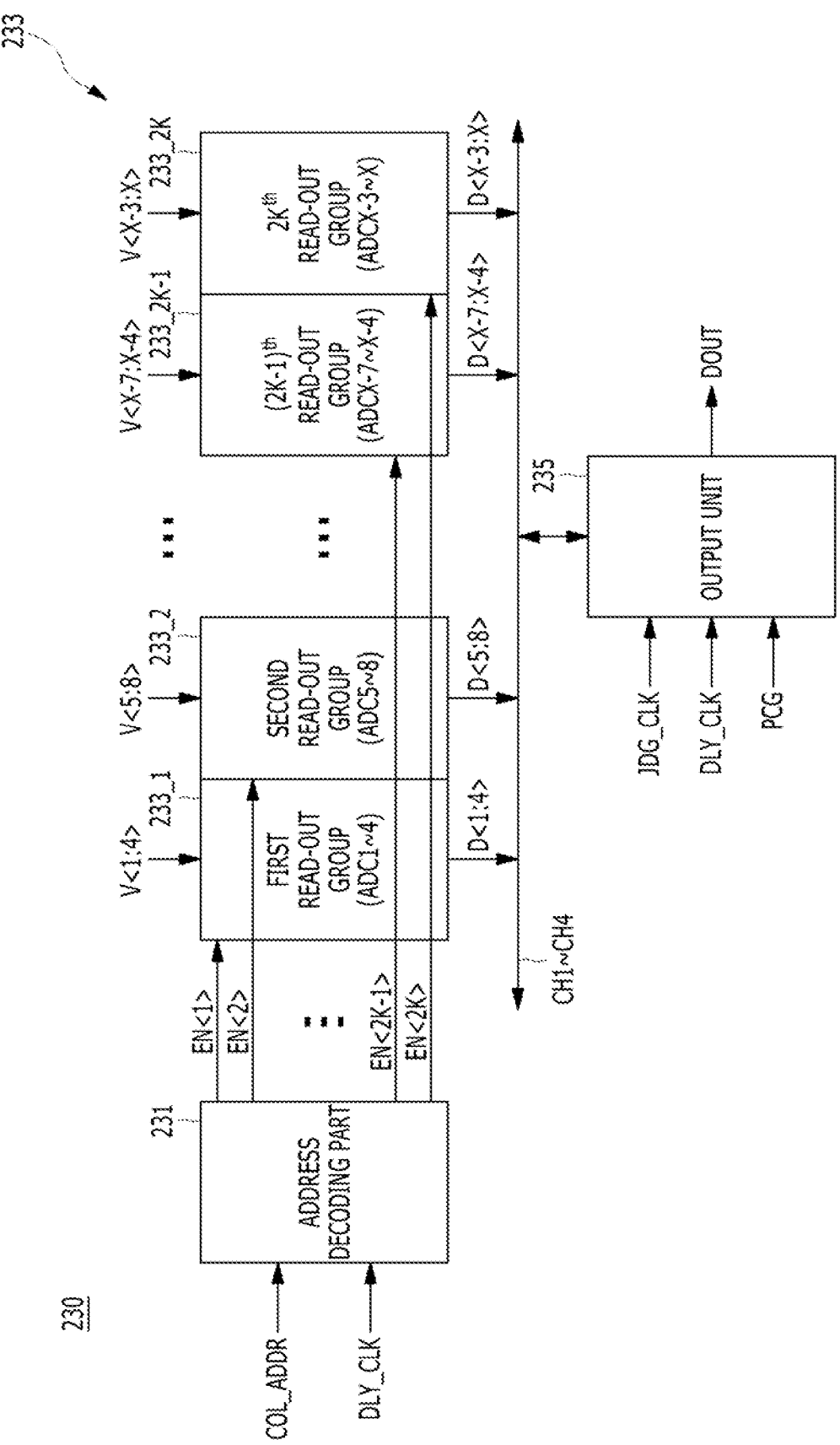
FIG. 11 is a block diagram illustrating a read-out processing block shown in FIG. 7.

FIG. 11 is a block diagram illustrating the read-out processing block 230 shown in FIG. 7.

Referring to FIG. 11, the read-out processing block 230 may include an address decoding part 231, a read-out part 233 and an output part 235.

The address decoding part 231 may decode the column address signal COL_ADDR and the delayed clock signal DLY_CLK to sequentially generate first to $2K^{th}$ enable signals EN<1:2K>. The address decoding part 231 may generate the first to $2K^{th}$ enable signals EN<1:2K> that are double of the aforementioned first to $K^{th}$ enable signals EN<1:K> in the comparative example of FIGS. 2 to 6 because the delayed clock signal DLY_CLK is used as an additional input bit. In other words, the address decoding part 231 may sequentially generate two enable signals per single period of the source clock signal COL_CLK. For example, the address decoding part 231 may sequentially generate the first and second enable signals EN<1:2> during a first period of the source clock signal COL_CLK, the third and fourth enable signals EN<3:4> during a second period of the source clock signal COL_CLK, and the $(2K−1)^{th}$ and $2K^{th}$ enable signals EN<2K−1:2K> during a $K^{th}$ period of the source clock signal COL_CLK.

The read-out part 233 may include first to $2K^{th}$ read-out groups 233_1 to 233_2K corresponding to the first to $2K^{th}$ enable signals EN<1:2K>, respectively. The first to $2K^{th}$ read-out groups 233_1 to 233_2K may sequentially operate in response to the first to $2K^{th}$ enable signals EN<1:2K>, and include 4 analog-to-digital converters ADC each corresponding to 4 column lines.

For example, first to fourth analog-to-digital converters ADC1 to ADC4 included in the first read-out group 233_1 may simultaneously convert the first pixel group signal V<1:4> transmitted through the first to fourth column lines into first to fourth digital signals D<1:4>, and then simultaneously read out the first to fourth digital signals D<1:4> to first to fourth channels CH1 to CH4 in response to the first enable signal EN<1>. Fifth to eighth analog-to-digital converters ADC5 to ADC8 included in the second read-out group 233_2 may simultaneously convert the second pixel group signal V<5:8> transmitted through the fifth to eighth column lines into fifth to eighth digital signals D<5:8>, and then simultaneously read out the fifth to eighth digital signals 0<5:8> to the first to fourth channels CH1 to CH4 in response to the second enable signal EN<2>, $(X-3)^{th}$ to $X^{th}$ analog-to-digital converters ADCX-3 to ADCX included in the $2K^{th}$ read-out group 233_2K may simultaneously convert the $2K^h$ pixel group signal V<X−3:X> transmitted through the $(X-3)^{th}$ to $X^{th}$ column lines into $(X-3)^{1h}$ to $X^{th}$ digital signals D<X−3:X>, and then simultaneously read out the $(X-3)^{th}$ to $X^{th}$ digital signals D<X−3:X> to the first to fourth channels CH1 to CH4 in response to the $2K^{th}$ enable signal EN<2K>.

Among the first to $X^{th}$ digital signals D<1:X>, the first to fourth digital signals D<1:4> are referred to as a first digital group signal D<1:4>, and the fifth to eighth digital signals D<5:8> are referred to as a second digital group signal D<5:8>, and the $(X-3)^{th}$ to $X^{th}$ digital signals D<X−3:X> are referred to as a $2K^{th}$ digital group signal D<X−3:X>. The first to $X^{th}$ digital signals D<1:X> may include the first to $2K^{th}$ digital group signals 0<1:4> to D<X−3:X>.

The read-out part 233 may sequentially read out a couple of digital group signals per single period of the source clock signal COL_CLK to the first to fourth channels CH1 to CH4 in response to the first to $2K^{th}$ enable signals EN<1:2K>.

For example, the read-out part 233 may sequentially read out the first and second digital group signals D<1:4> and D<5:8> to the first to fourth channels CH1 to CH4 during a first period of the source clock signal COL_CLK, the third and fourth digital group signals D<9:12> and D<13:16> to the first to fourth channels CH1 to CH4 during a second period of the source clock signal COL_CLK, and $(2K-1)^{th}$ and $2K^{th}$ digital group signals D<X−7:X−4> and D<X−3:X> to the first to fourth channels CH1 to CH4 during a $K^{th}$ period of the source clock signal COL_CLK.

A coupling structure between the read-out part 233 and the first to fourth channels CH1 to CH4 is described in detail with reference to FIG. 12.

Figure 12:
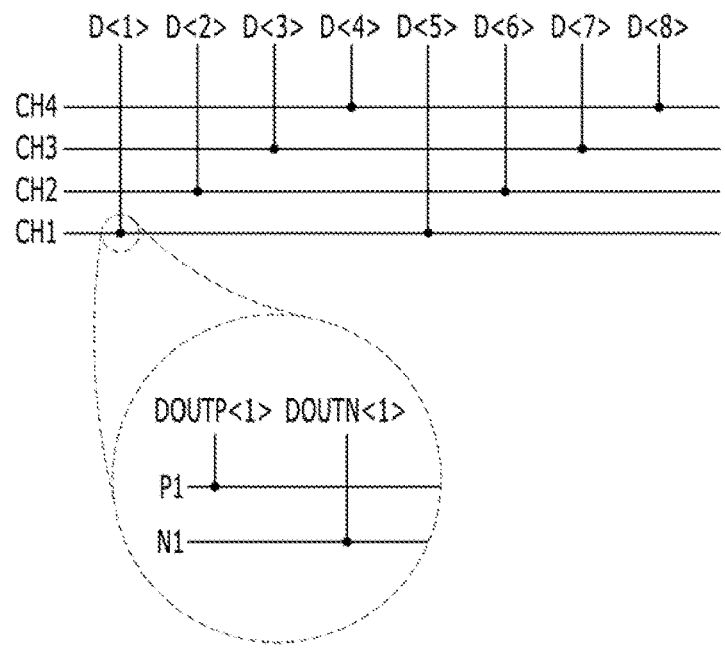
FIG. 12 is a diagram illustrating a coupling structure between first and second read-out groups and first to fourth channels shown in FIG. 11.

FIG. 12 is a diagram illustrating a coupling structure between a read-out part 233 and first to fourth channels CH1 to CH4 shown in FIG. 11. FIG. 12 exemplarily shows the coupling structure between the first read-out group 233_1, the second read-out group 233_2 and the first to fourth channels CH1 to CH4.

Referring to FIG. 12, output lines of the first digital group signal D<1:4> outputted from the first read-out group 233_1 may be coupled with the first to fourth channels CH1 to CH4, respectively. Similarly, output lines of the second digital group signal D<5:8> outputted from the second read-out group 233_2 may be coupled with the first to fourth channels CH1 to CH4, respectively. Although not illustrated in the drawings, the coupling structure between the third to $2K^{th}$ read-out groups 233_3 to 233_2K and the first to fourth channels CH1 to CH4 may be sufficiently analogized by those skilled in the art.

Each of the first to fourth channels CH1 to CH4 may include differential lines. For example, the first channel CH1 may include first differential lines P1 and N1. Although not illustrated in the drawings, the second to fourth channels CH2 to CH4 may include second to fourth differential lines P2 to P4 and N2 to N4. Each of the first to $X^{th}$ digital signals D<1:X> may include differential signals. For example, the first digital signal D<1> may include first differential signals DOUTP<1> and DOUTN<1>, and the first differential signals DOUTP<1> and DOUTN<1> may be read out to the first differential lines P1 and N1. Although not illustrated in the drawings, the second to eighth digital signals D<2:8> may include second to eighth differential signals DOUTP<2:8> and DOUTN<2:8>, and the second to eighth differential signals DOUTP<2:8> and DOUTN<2:8> may be read out to the first to fourth differential lines P1 to P4 and N1 to N4.

Referring back to FIG. 11, the output part 235 may output the first to $2K^{th}$ digital group signals D<1:4> to D<X−3:X> that are sequentially read out through the first to fourth channels CH1 to CH4 as a data group signal DOUT in response to the judge clock signal JDG_CLK, the delayed clock signal DLY_CLK and the precharge signal PCG. The output part 235 may output the data group signal DOUT corresponding to a couple of digital group signals per single period of the source clock signal COL_CLK.

For example, the output part 235 may simultaneously output the first and second digital group signals D<1:4> and D<5:8> as the data group signal DOUT, and then simultaneously output the third and fourth digital group signals D<9:12> and D<13:16> as the data group signal DOUT, and then simultaneously output the $(2K-1)^{th}$ and $2K^{th}$ digital group signals D<X−7:X−4> and D<X−3:X> as the data group signal DOUT.

Figure 13:
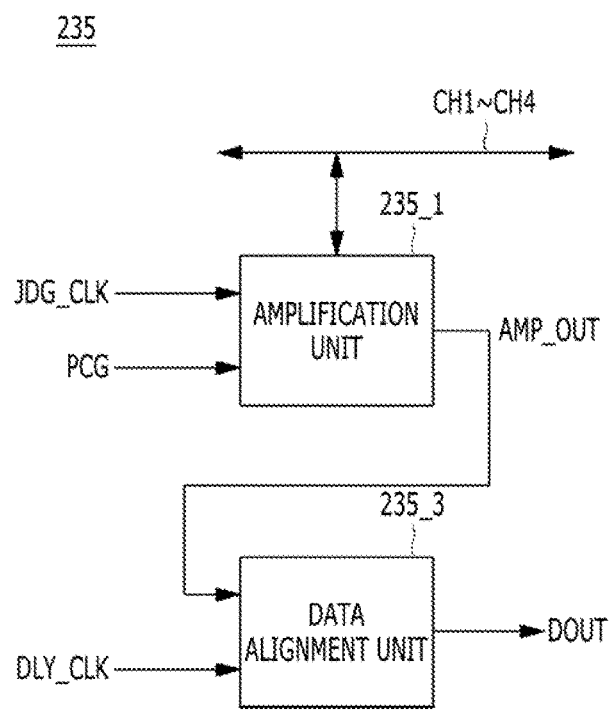
FIG. 13 is a block diagram illustrating an output part shown in FIG. 11.

FIG. 13 is a block diagram illustrating the output part 235 shown in FIG. 11.

Referring to FIG. 13, the output part 235 may include an amplification unit 235_1 and a data alignment unit 235_3.

The amplification unit 235_1 may periodically precharge the first to fourth channels CH1 to CH4 to a predetermined voltage level in response to the precharge signal PCG. For example, the amplification unit 235_1 may precharge the first to fourth channels CH1 to CH4 to a high voltage VDD level during every predetermined section corresponding to the falling edge of the judge clock signal JDG_CLK.

The amplification unit 235_1 may amplify the first to $2K^{th}$ digital group signals D<1:4> to D<X−3:X> sequentially transmitted through the first to fourth channels CH1 to CH4 in response to the judge clock signal JDG_CLK to output the amplified digital group signal as an amplification group signal AMP_OUT. The amplification unit 235_1 may sequentially output a previous amplification group signal and a current amplification group signal corresponding to a couple of digital group signals per single period of the source clock signal COL_CLK as the amplification group signal AMP_OUT.

For example, the amplification unit 235_1 may sequentially output a first previous amplification group signal and a first current amplification group signal as the amplification group signal AMP_OUT by sequentially amplifying the first and second digital group signals D<1:4> and D<5:8> during a first amplification section corresponding to a first period of the source clock signal COL_CLK, a second previous amplification group signal and a second current amplification group signal as the amplification group signal AMP_OUT by sequentially amplifying the third and fourth digital group signals D<9:12> and D<13:16> during a second amplification section corresponding to a second period of the source clock signal COL_CLK, and a $K^{th}$ previous amplification group signal and a $K^{th}$ current amplification group signal as the amplification group signal AMP_OUT by sequentially amplifying the $(2K-1)^{th}$ and $2K^{th}$ digital group signals D<X-7:X-4> and D<X-3:X> during a $K^{th}$ amplification section corresponding to a $K^{th}$ period of the source clock signal COL_CLK.

In the first digital signal D<1> included in the first digital group signal D<1:4>, the amplification unit 235_1 may precharge the first differential lines P1 and N1 to the same voltage level in response to the precharge signal PCG, and then sense and amplify a voltage difference occurring between the first differential lines P1 and N1 in response to the judge clock signal JDG_CLK when the first differential signals DOUTP<1> and DOUTN<1> are read out.

For example, the amplification unit 235_1 may include first to fourth sense amplifiers one to one corresponding to the first and fourth channels CH1 to CH4.

The data alignment unit 235_3 may align and output the amplification group signal AMP_OUT as the data group signal DOUT in response to the delayed clock signal DLY_CLK.

Figure 14:
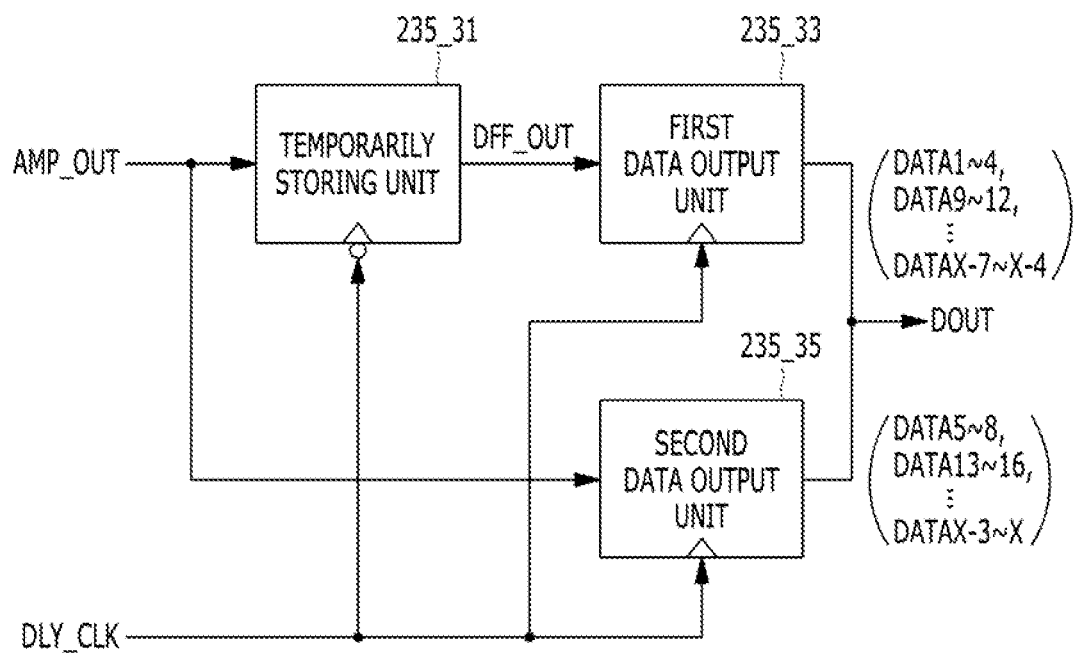
FIG. 14 is a block diagram illustrating a data alignment unit shown in FIG. 13.

FIG. 14 is a block diagram illustrating the data alignment unit 235_3 shown in FIG. 13.

Referring to FIG. 14, the data alignment unit 235_3 may include a temporarily storing unit 235_31, a first data output unit 235_33 and a second data output unit 235_35.

The temporarily storing unit 235_31 may store the previous amplification group signal of the amplification group signal AMP_OUT in response to the delayed clock signal DLY_CLK. For example, the temporarily storing unit 235_31 may store the previous amplification group signal in synchronization with a falling edge of the delayed clock signal DLY_CLK.

The first data output unit 235_33 may output a storing signal DFF_OUT stored in the temporarily storing unit 235_31 as first half data group signals DATA1 to 4 to DATAX-7 to X-4 corresponding to half of the data group signal DOUT in response to the delayed clock signal DLY_CLK. For example, the first data output unit 235_33 may sequentially output the first half data group signals DATA1 to 4 to DATAX-7 to X-4 corresponding to the storing signal DFF_OUT in synchronization with a rising edge of the delayed clock signal DLY_CLK.

The second data output unit 235_35 may output the current amplification group signal of the amplification group signal AMP_OUT as second half data group signals DATA5 to 8 to DATAX-3 to X corresponding to the other half of the data group signal DOUT in response to the delayed clock signal DLY_CLK. For example, the second data output unit 235_35 may sequentially output the second half data group signals DATA5 to 8 to DATAX-3 to X corresponding to the present amplification group signal in synchronization with the rising edge of the delayed clock signal DLY_CLK.

For example, each of the temporarily storing unit 235_31, the first data output unit 235_33 and the second data output unit 235_35 may include a D flip-flop.

Figure 15:
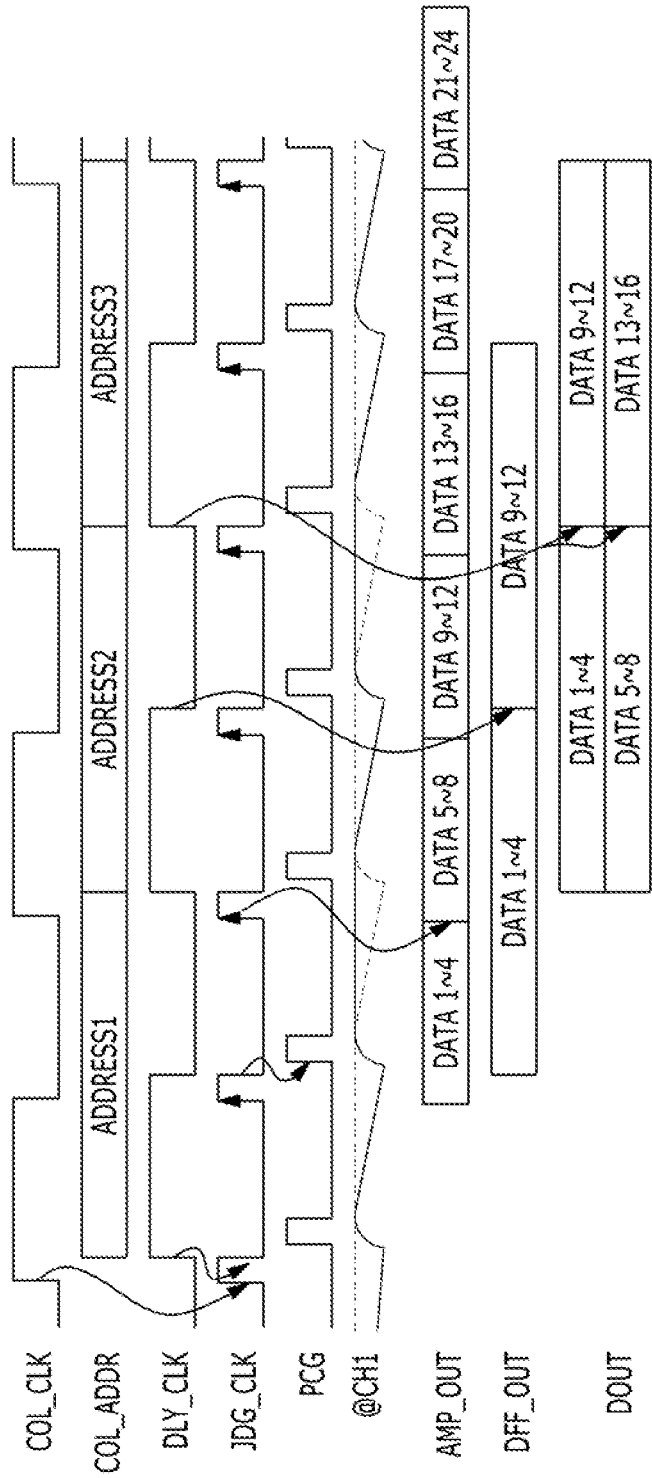
FIG. 15 is a timing diagram for describing an operation of an image sensing device shown in FIG. 7.

FIG. 15 is a timing diagram for describing an operation of the image sensing device 200 shown in FIG. 7.

Although not illustrated in the drawings, the operation of the pixel block 210 will be described. The pixel block 210 may generate the first to $X^{th}$ pixel signals V<1:X> every unit row time. For example, the pixel block 210 may generate the first to $X^{th}$ pixel signals V<1:X> from the first to $X^{th}$ pixels (not shown) arranged in a first row during the first unit row time, and generate the first to $X^{th}$ pixel signals V<1:X> from the first to $X^{th}$ pixels (not shown) arranged in a second row during the second unit row time, and generate the first to $X^{th}$ pixel signals V<1:X> from the first to $X^{th}$ pixels (not shown) arranged in a last row during a last unit row time.

Referring to FIGS. 7 to 15, the read-out control block 220 may delay the source clock signal COL_CLK by a predetermined delay time to generate the delayed clock signal DLY_CLK, and synchronize the source address signal COL_ADD with the delayed clock signal DLY_CLK to generate the source address signal COL_ADD as the column address signal COL_ADDR. The read-out control block 220 may logically combine the source clock signal COL_CLK and the delayed clock signal DLY_CLK to generate the judge clock signal JDG_CLK, a frequency of which is two time higher than a frequency of the source clock signal COL_CLK, and generate the precharge signal PCG that pulses every falling edge of the judge clock signal JDG_CLK.

The read-out processing block 230 may read out the first to $X^{th}$ pixel signals V<1:X> by column groups in response to the precharge signal PCG, the column address signal COL_ADDR, the delayed clock signal DLY_CLK and the judge clock signal JDG_CLK. In other words, the read-out processing block 230 may sequentially read out the first to $2K^{th}$ pixel group signals V<1:4> to V<X-3:X>.

To be specific, the read-out processing block 230 may periodically precharge the first to fourth channels CH1 to CH4 to a predetermined voltage level in response to the precharge signal PCG. For example, the read-out processing block 230 may precharge the first to fourth differential lines P1 to P4 and N1 to N4 to the high voltage VDD level during every predetermined section corresponding to the falling edge of the judge clock signal JDG_CLK.

The read-out processing block 230 may sequentially read out the first to $2K^{th}$ digital group signals D<1:4> to D<X-3:X>, which correspond to the first to $2K^{th}$ pixel group signals V<1:4> to V<X-3:X>, to the first to fourth channels CH1 to CH4 in response to the column address signal COL_ADDR and the delayed clock signal DLY_CLK. The read-out processing block 230 may sequentially read out a couple of digital group signals per single period of the source clock signal COL_CLK to the first to fourth channels CH1 to CH4.

To be specific, the address decoding part 231 may sequentially generate the first to $2K^{th}$ enable signals EN<1:2K> during the unit row time by decoding the column address signal COL_ADDR and the delayed clock signal DLY_CLK. Particularly, although not illustrated in the drawings, the address decoding part 231 may sequentially generate the first and second enable signals EN<1> and EN<2> during a first enable section corresponding to a first period of the source clock signal COL_CLK, the third and fourth enable signals EN<3> and EN<4> during a second enable section corresponding to a second period of the source clock signal COL_CLK, and $(2K-1)^{th}$ and $2K^{th}$ enable signals EN<2K-1> and EN<2K> during a $K^{th}$ enable section corresponding to a $K^{th}$ period of the source clock signal COL_CLK.

The first to $2K^{th}$ read-out groups 233_1 to 233_2K may sequentially output the first to $2K^{th}$ digital group signals D<1:4> to D<X-3:X>, which correspond to the first to $2K^{th}$ pixel group signals V<1:4> to V<X-3:X>, to the first to fourth channels CH1 to CH4 in response to the first to $2K^{th}$ enable signals EN<1:2K>.

For example, the first read-out group 233_1 may convert the first pixel group signal V<1:4> into the first digital group signal D<1:4> and output the converted signal to the first and fourth channels CH1 to CH4 in response to the first enable signal EN<1>, and the second read-out group 233_2 may convert the second pixel group signal V<5:8> into the second digital group signal D<5:8> and output the converted signal to the first and fourth channels CH1 to CH4 in response to the second enable signal EN<2>, and the $2K^{th}$ read-out group 233_2K may convert the $2K^{th}$ pixel group signal V<X-3:X> into the $2K^{th}$ digital group signal D<X-3:X> and output the converted signal to the first and fourth channels CH1 to CH4 in response to the $2K^{th}$ enable signal EN<2K>.

For example, the first and second read-out groups 233_1 and 233_2 may sequentially output the first and second digital group signals D<1:4> and D<5:8> to the first to fourth channels CH1 to CH4 during a first read-out section corresponding to the first period of the source clock signal COL_CLK, and the third and fourth read-out groups 233_3 and 233_4 may sequentially output the third and fourth 1'5 digital group signals D<9:12> and D<13:16> to the first to fourth channels CH1 to CH4 during a second read-out section corresponding to the second period of the source clock signal COL_CLK, and the $(2K-1)^{th}$ and $2K^{th}$ read-out groups 233_2K-1 and 233_2K may sequentially output the $(2K-1)^{th}$ and $2K^{th}$ digital group signals D<X-7:X-4> and D<X-3:X> to the first to fourth channels CH1 to CH4 during a $K^{th}$ read-out section corresponding to the $K^{th}$ period of the source clock signal COL_CLK.

Each of the first to fourth channels CH1 to CH4 may include the differential lines, and each of the first to $X^{th}$ digital signals D<1:X> may include the differential signals. Hereinafter, the digital signals D<1> to D<X-3> outputted to the first channel CH1 are representatively described.

The first differential signals DOUTP<1> and DOUTN<1> corresponding to the first digital signal D<1> may be outputted to first differential lines P1 and N1 corresponding to the first channel CH1 during an enabling section of the first enable signal EN<1>, and the fifth differential signals DOUTP<5> and DOUTN<5> corresponding to the fifth digital signal D<5> may be outputted to first differential lines P1 and N1 corresponding to the first channel CH1 during an enabling section of the second enable signal EN<2>, and the $(X-3)^{th}$ differential signals DOUTP<X-3> and DOUTN<X-3> corresponding to the $(X-3)^{th}$ digital signal D<X-3> may be outputted to first differential lines P1 and N1 corresponding to the first channel CH1 during an enabling section of the $2K^{th}$ enable signal EN<2K>.

The read-out processing block 230 may amplify the first to $2K^{th}$ digital group signals D<1:4> to D<X-3:X> outputted to the first to fourth channels CH1 to CH4, and read out the amplified digital group signals as the data group signal DOUT in response to the judge clock signal JDG_CLK. The read-out processing block 230 may output the data group signal DOUT corresponding to a couple of digital group signals per single period of the source clock signal COL_CLK.

For example, the output part 235 may simultaneously output the first and second digital group signals D<1:4> and D<5:8> as the data group signal DOUT, and then simultaneously output the third and fourth group signals D<9:12> and 0<13:16> as the data group signal DOUT, and then simultaneously output the $(2K-1)^{th}$ and $2K^{th}$ digital group signals D<X-7:X-4> and D<X-3:X> as the data group signal DOUT. A detailed description thereon is provided below.

The amplification unit 235_1 may periodically precharge the first to fourth channels CH1 to CH4 to a predetermined voltage level in response to the precharge signal PCG. For example, the amplification unit 235_1 may precharge the first to fourth channels CH1 to CH4 to the high voltage VDD level during every predetermined section corresponding to the falling edge of the judge clock signal JDG_CLK. In the drawing, the waveforms of the first channel CH1 are illustrated.

The amplification unit 235_1 may amplify the first to $2K^{th}$ digital group signals D<1:4> to D<X-3:X> that are sequentially transmitted through the first to fourth channels CH1 to CH4 and output the amplified digital group signals as the amplification group signal AMP_OUT in response to the judge clock signal JDG_CLK. The amplification unit 235_1 may sequentially output the previous amplification group signal and the current amplification group signal corresponding to a couple of digital group signals per single period of the source clock signal COL_CLK as the amplification group signal AMP_OUT.

For example, the amplification unit 235_1 may sequentially output first previous amplification group signals DATA1 to DATA4 and first current amplification group signals DATA5 to DATA8 as the amplification group signal AMP_OUT by sequentially amplifying the first and second digital group signals D<1:4> and D<5:8> during the first amplification section corresponding to the first period of the source clock signal COL_CLK, and sequentially output second previous amplification group signals DATA9 to DATA12 and second current amplification group signals DATA13 to DATA16 as the amplification group signal AMP_OUT by sequentially amplifying the third and fourth digital group signals D<9:12> and D<13:16> during the second amplification section corresponding to the second period of the source clock signal COL_CLK, and sequentially output $K^{th}$ previous amplification group signals DATAX-7 to DATAX-4 and $K^{th}$ current amplification group signals DATAX-3 to DATAX as the amplification group signal AMP_OUT by sequentially amplifying the $(2K-1)^{th}$ and $2K^{th}$ digital group signals D<X-7:X-4> and D<X-3:X> during the $K^{th}$ amplification section corresponding to the $K^{th}$ period of the source clock signal COL_CLK.

An amplification operation of the amplification unit 235_1 is described in detail with an example of the first digital signal D<1> included in the first digital group signal D<1:4>. The amplification unit 235_1 may precharge the first differential lines P1 and N1 corresponding to the first channel CH1 to the same voltage level in response to the precharge signal PCT, and then sense and amplify the voltage difference between the first differential lines P1 and N1 in response to the judge clock signal JDG_CLK as the first differential signals DOUTP<1> and DOUTN<1> corresponding to the first digital signal D<1> are read out to the first differential lines P1 and N1.

The data alignment unit 235_3 may temporarily store the previous amplification group signals DATA1 to 4 to DATAX-7 to X-4 among the amplification group signal AMP_OUT in synchronization with the falling edge of the delayed clock signal DLY_CLK, and then simultaneously output the current amplification group signals DATA5 to 8 to DATAX-3 to X among the amplification group signal AMP_OUT and the temporarily stored previous amplification group signals DATA1 to 4 to DATAX-7 to X-4 in synchronization with the rising edge of the delayed clock signal DLY_CLK as the data group signal DOUT. In other words, the data alignment unit 235_3 may align four data signals included in the previous amplification group signals and four data signals included in the current amplification group signals, and simultaneously output the aligned eight data signals as the data group signal DOUT per a single period of the source clock signal COL_CLK.

To sum up, the read-out operation of the image sensing device 200 may include sequentially inputting the source address signal COL_ADD together with the source clock signal COL_CLK, sequentially reading out the first to $2K^{th}$ pixel group signals V<1:4> to V<X-3:X> by the double data rate (DDR) scheme through the first to fourth channels CH1 to CH4 in response to the source clock signal COL_CLK and the source address signal COL_ADD, and simultaneously reading out the first to $2K^{th}$ digital group signals D<1:4> to D<X-3:X> that are read out by the DDR scheme through the first to fourth channels CH1 to CH4 per the source clock signal COL_CLK by units of couples of digital group signals.

The reading-out of the first to $2K^{th}$ pixel group signals V<1:4> to V<X-3:X> may include generating the judge clock signal JDG_CLK, a frequency of which is two times higher than the frequency of the source clock signal COL_CLK, sequentially generating two enable signals EN<1:2> to E<2K-1:2K> per the source address signal COL_ADD, and sequentially reading out two pixel group signals among the first to $2K^{th}$ pixel group signals V<1:4> to V<X-3:X> per a single period of the source clock signal COL_CLK through the first to fourth channels CH1 to CH4 in response to the judge clock signal JDG_CLK and the first to $2K^{th}$ enable signals EN<1:2K>.

The reading-out of the first to $2K^{th}$ digital group signals D<1:4> to D<X-3:X> per the source clock signal COL_CLK by units of couples of digital group signals may include temporarily storing the digital signal that is read out earlier among a couple of digital group signals corresponding to the falling edge of the source clock signal COL_CLK, and simultaneously reading out the digital signal that is read out later among a couple of digital group signals corresponding to the rising edge of the source clock signal COL_CLK and the temporarily stored digital signal as the data group signal DOUT.

In accordance with the embodiment of the present invention described above, eight data signals per source clock signal may be read out similarly to the aforementioned comparative example, and the number of channels may be reduced relative to the comparative example.

Figure 16:
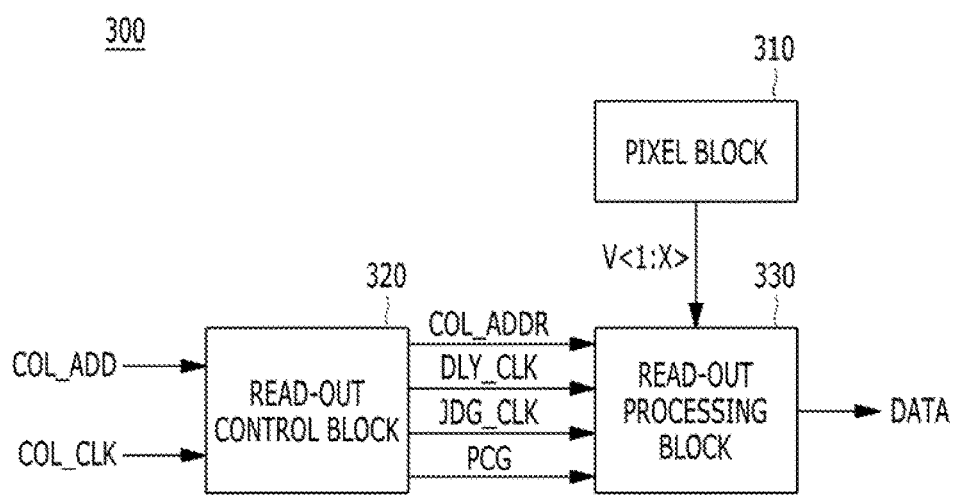
FIG. 16 is a block diagram illustrating an image sensing device in accordance with another embodiment of the present invention.

FIG. 16 is a block diagram illustrating an image sensing device 300 in accordance with another embodiment of the present invention.

Referring to FIG. 16, the image sensing device 300 may include a pixel block 310, a read-out control block 320, and a read-out processing block 330.

The pixel block 310 and the read-out processing block 330 may be the same as the pixel block 210 and the read-out processing block 230 described with reference to FIGS. 7 to 15.

The read-out control block 320 may be the same as the read-out control block 220 described with reference to FIGS. 7 to 15 except for a read-out control part 323, which will be described below.

Figure 17:
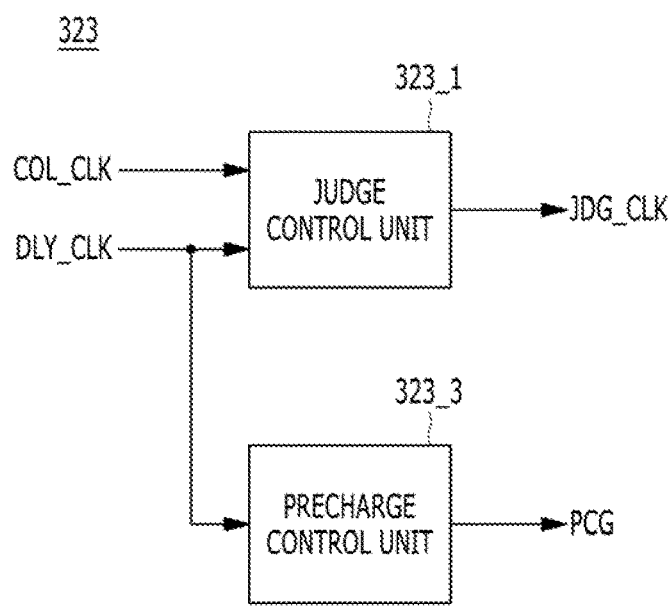
FIG. 17 is a block diagram illustrating a read-out control part included in a read-out control block shown in FIG. 16.

FIG. 17 is a block diagram illustrating the read-out control part 323 included in the read-out control block 320 shown in FIG. 16.

Referring to FIG. 17, the read-out control part 323 may include a judge control unit 323_1 and a precharge control unit 323_3.

The judge control unit 323_1 may generate a judge clock signal JDG_CLK, a frequency of which is two times higher than a frequency of a source clock signal COL_CLK, in response to the source clock signal COL_CLK and a delayed clock signal DLY_CLK. For the convenience, the delayed clock signal DLY_CLK is referred to as a first delayed clock signal DLY_CLK hereafter. For example, the judge control unit 323_1 may include an exclusive OR gate for outputting the judge clock signal JDG_CLK by performing an exclusive OR (XOR) operation on the source clock signal COL_CLK and the first delayed clock signal DLY_CLK. The judge control unit 323_1 may be the same as the judge control unit 223_1 described with reference to FIG. 10.

The precharge control unit 323_3 may generate a precharge signal PCG, which has the same frequency as the judge clock signal JDG_CLK, in response to the first delayed clock signal DLY_CLK. The precharge signal PCG may have a different phase from the judge clock signal JDG_CLK. Since the precharge signal PCG is generated based on the first delayed clock signal DLY_CLK, the precharge signal PCG may not be influenced by a pulse width of the judge clock signal JDG_CLK. In other words, the precharge signal PCG may have a pulse width having enough margin regardless of the pulse width of the judge clock signal JDG_CLK.

Figure 18:
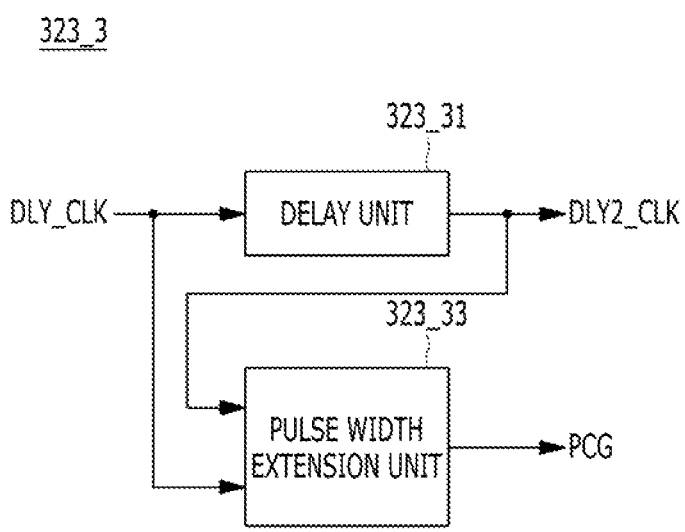
FIG. 18 is a block diagram illustrating a precharge control unit shown in FIG. 17.

FIG. 18 is a block diagram illustrating the precharge control unit 323_3 shown in FIG. 17.

Referring to FIG. 18, the precharge control unit 323_3 may include a delay unit 323_31 and a pulse width extension unit 323_33.

The delay unit 323_31 may delay the first delayed clock signal DLY_CLK by a predetermined delay time (hereinafter referred to as "a second delay time") to generate a second delayed clock signal DLY2_CLK.

The pulse width extension unit 323_33 may generate the precharge signal PCG in response to the first delayed clock signal DLY_CLK and the second delayed clock signal DLY2_CLK. For example, the pulse width extension unit 323_33 may include an exclusive OR gate for outputting the precharge signal PCG by performing an exclusive OR (XOR) operation on the first delayed clock signal DLY_CLK and the second delayed clock signal DLY2_CLK.

Hereafter, an operation of the image sensing device 300 having the aforementioned structure is described with reference to FIG. 19.

Figure 19:
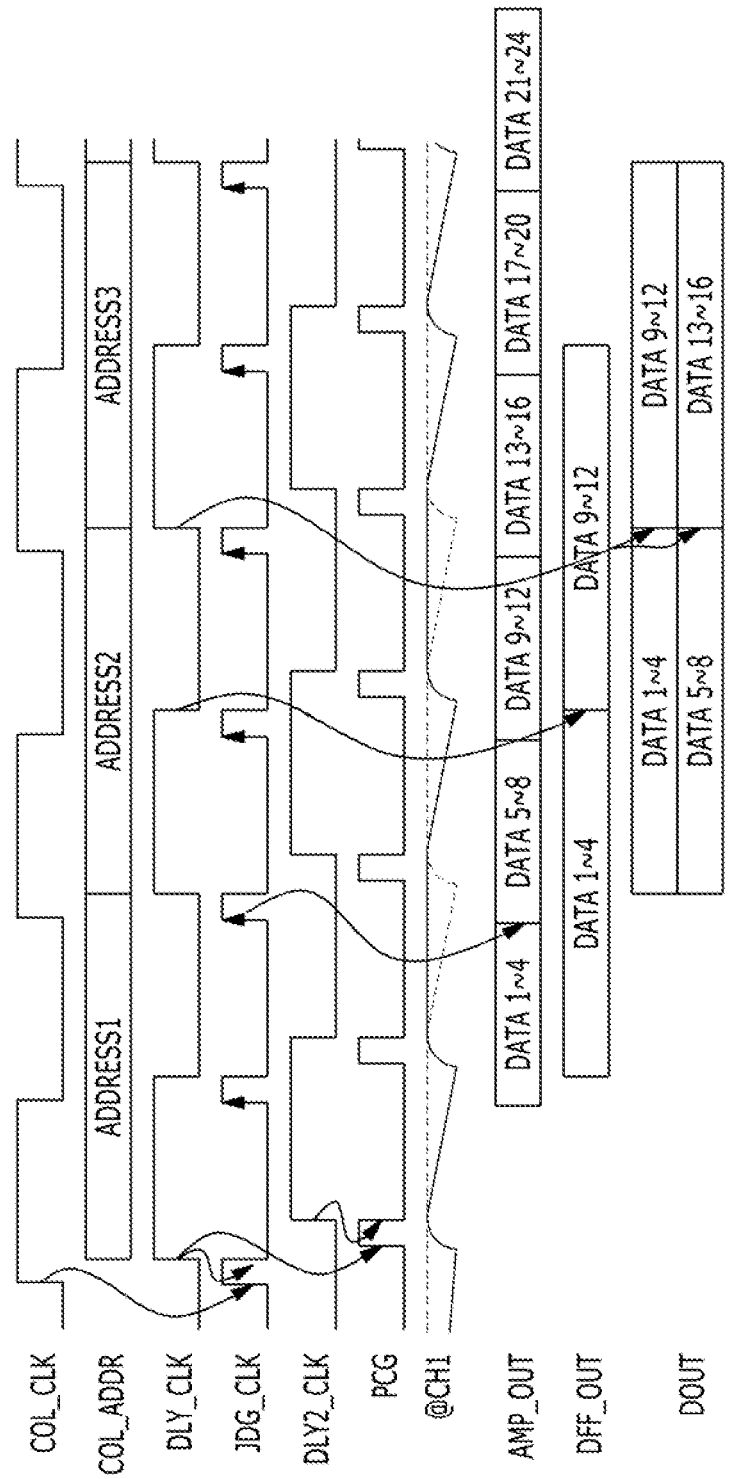
FIG. 19 is a timing diagram for describing an operation of an image sensing device shown in FIG. 16.

FIG. 19 is a timing diagram for describing an operation of the image sensing device 300 shown in FIG. 16.

The operation of the image sensing device 300 may be the same as the operation of the image sensing device 200 as described with reference to FIG. 15 except for processes for generating the precharge signal PCG of the image sensing device 300, which will be described hereafter.

Referring to FIG. 19, the precharge control unit 323_3 may generate the precharge signal PCG, which has the same frequency as the judge clock signal JDG_CLK and a different phase from the judge clock signal JDG_CLK, in response to the first delayed clock signal DLY_CLK. Particularly, the precharge control unit 323_3 may generate the precharge signal PCG having a pulse width greater than a pulse width of the judge clock signal JDG_CLK.

For example, the precharge control unit 323_3 may generate the second delayed clock signal DLY2_CLK by delaying the first delayed clock signal DLY_CLK by amount of the second delay time, and may generate the precharge signal PCG by performing an exclusive OR (XOR) operation on the first delayed clock signal DLY_CLK and the second delayed clock signal DLY2_CLK. The pulse width of the precharge signal PCG may correspond to the second delay time. On the other hand, the pulse width of the judge clock signal JDG_CLK may correspond to a delay time (hereinafter referred to as "a first delay time") reflected when the first delayed clock signal DLY_CLK is generated based on the source clock signal COL_CLK. When the second delay time is greater than the first delay time, the pulse width of the precharge signal PCG may be larger than the pulse width of the judge clock signal JDG_CLK.

Therefore, the read-out processing block 330 may precharge the first to fourth channels CH1 to CH4 during enough precharge time in response to the precharge signal PCG.

In accordance with the embodiment of the present invention, the image sensing device 300 may have advantages in read-out speed and occupied area. Also, the image sensing device 300 may have an advantage of securing enough precharge time.

In accordance with the embodiments of the present invention, read-out speed may be improved, and the increase in occupied area may be minimized. Accordingly, performance of an image sensing device such as resolution may be improved.

In accordance with the embodiments of the present invention, as the precharge time required for a read-out operation is sufficient, the reliability of the read-out operation may be improved.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

For example, although it is described in the embodiments of the present invention that the first to fourth channels are used, the inventive concept is not limited to this, and more or less than four channels may be used.

Also, although it is described in the embodiments of the present invention that a read-out operation is performed based on a double data rate (DDR) scheme, the inventive concept is not limited to this, and the read-out operation may be performed based on other data transmission rate schemes such as a quad data rate (QDR) scheme.

What is claimed is:

1. An image sensing device, comprising:
a pixel block including a plurality of pixel groups and suitable for generating a plurality of pixel group signals, wherein each of the plurality of pixel groups includes a plurality of pixels and each of the plurality of pixel group signals includes a plurality of pixel signals generated from the plurality of pixels;
a read-out control block suitable for generating a selection address signal, one or more address clock signals having the same frequency as a source clock signal, and a judge clock signal having a higher frequency than a source clock signal, in response to a source address signal and the source clock signal; and
a read-out block suitable for reading out a plurality of pixel group signals through a plurality of channels corresponding to the plurality of pixel signals in response to the selection address signal, the address clock signals and the judge clock signal, wherein the read-out block sequentially reads out two or more pixel group signals of the plurality of pixel group signals per single period of the source clock signal through the plurality of channels,
wherein the read-out control block delays the source clock signal by a predetermined delay time, and outputs the delayed source clock as the address clock signal,
wherein the read-out control block generates the judge clock signal in response to the source clock signal and the delayed source clock signal.

2. The image sensing device of claim 1, wherein the read-out control block samples the source address signal as the selection address signal based on the delayed source clock signal.

3. The image sensing device of claim 1, wherein the read-out control block generates the judge clock signal with a frequency two times higher than a frequency of the source clock signal.

4. An image sensing device, comprising:
a pixel block including a plurality of pixel groups and suitable for generating a plurality of pixel group signals, wherein each of the plurality of pixel groups includes N number of pixels, where N is equal to or greater than 2, and each of the plurality of pixel group signals includes N number of pixel signals generated from the N number of pixels;
an address control block suitable for generating a selection address signal and a first delayed clock signal in response to a source address signal and a source clock signal, wherein the first delayed clock signal is generated by delaying the source clock signal;
a read-out control block suitable for generating a judge clock signal having a higher frequency than the source clock signal, and a precharge signal having the same frequency as the judge clock signal in response to the source clock signal and the first delayed clock signal;
a first read-out block suitable for sequentially reading out M number of pixel group signals of the plurality of pixel group signals, where M is equal to or greater than 2, per single period of the source clock signal through N number of channels in response to the selection address signal and the first delayed clock signal; and
a second read-out block suitable for simultaneously reading out M*N number of digital signals that are sequentially read out per single period of the source clock signal through the N number of channels, in response to the judge clock signal and the precharge signal,
wherein the read-out control block generates the judge clock signal in response to the source clock signal and the first delayed clock signal.

5. The image sensing device of claim 4, wherein the address control block includes:
a first delay unit suitable for generating the first delayed clock signal by delaying the source clock signal by a first delay time; and
a sampling unit suitable for sampling the source address signal as the selection address signal based on the first delayed clock signal.

6. The image sensing device of claim 5, wherein the read-out control block includes:
a judge control part suitable for generating the judge clock signal in response to the source clock signal and the first delayed clock signal; and
a precharge control part suitable for generating the precharge signal having a different phase from the judge clock signal in response to the judge clock signal.

7. The image sensing device of claim 6, wherein the judge control part includes an exclusive OR (XOR) gate.

8. The image sensing device of claim 6, wherein the precharge control part includes an edge detector for detecting a rising edge or a falling edge of the judge clock signal to generate the precharge signal.

9. The image sensing device of claim 6, wherein the precharge control part includes:
 a second delay unit suitable for generating a second delayed clock signal by delaying the judge clock signal by a second delay time; and
 a pulse width extension unit suitable for generating the precharge signal, a pulse width of which is greater than a pulse width of the judge clock signal, in response to the second delayed clock signal and the judge clock signal.

10. The image sensing device of claim 9, wherein the pulse width extension unit includes an exclusive OR (XOR) gate.

11. The image sensing device of claim 9, wherein the second delay time is greater than the first delay time.

12. The image sensing device of claim 4, wherein the first read-out block includes:
 an address decoding part suitable for sequentially generating M number of enable signals per single period of the source clock signal by decoding the selection address signal and the first delayed clock signal; and
 a column operation part suitable for sequentially outputting the N number of pixel signals per single period of the source clock signal the M number of times to the N number of channels in response to the M number of enable signals.

13. The image sensing device of claim 4, wherein the second read-out block includes:
 an amplification part suitable for amplifying the N number of digital signals the M number of times per single period of the source clock signal to generate M*N number of data signals; and
 a data alignment part suitable for aligning and outputting the M*N number of data signals in response to the first delayed clock signal.

14. The image sensing device of claim 13, wherein the data alignment part includes:
 a first storing unit suitable for storing the N number of data signals, which are generated firstly from the amplification part, in synchronization with one of a rising edge and a falling edge of the first delayed clock signal;
 a second storing unit suitable for storing the N number of data signals, which are stored in the first storing unit, in synchronization with the other edge of the first delayed clock signal; and
 a third storing unit suitable for storing the N number of data signals, which are generated secondly from amplification part, in synchronization with the other edge of the first delayed clock signal.

15. The image sensing device of claim 4,
 wherein the first read-out block sequentially reads out four pixel signals two times per single period of the source clock signal through four channels in response to the selection address signal and the first delayed clock signal, and
 wherein the second read-out block simultaneously reads out eight digital signals that are sequentially read out through the four channels, in response to the judge clock signal and the precharge signal.

16. An image sensing device, comprising:
a pixel block include a plurality of pixels arranged in rows and columns and suitable for simultaneously generating N number of first pixel signals and N number of second pixel signals, where N is equal to or greater than 2,
wherein the N number of first pixel signals are outputted from N number of first pixels arranged in different columns of the plurality of pixels and the N number of second pixel signals are outputted from N number of second pixels arranged in different columns of the plurality of pixels;
a read-out control block suitable for generating a selection address signal, one or more address clock signals having the same frequency as a source clock signal, and a judge clock signal having a higher frequency than a source clock signal, in response to a source address signal and the source clock signal; and
a read-out block suitable for sequentially reading out the N number of first pixel signals and the N number of second pixel signals per single period of the source clock signal through N number of channels, in response to the selection address signal, the address clock signals and the judge clock signal,
wherein the read-out control block delays the source clock signal by a predetermined delay time, and outputs the delayed source clock as the address clock signal,
wherein the read-out control block generates the judge clock signal in response to the source clock signal and the delayed source clock signal.

* * * * *